3,661,870
ISOBUTYLENE, 1,3-BUTADIENE, METHYL
BUTENE COPOLYMERS
Herbert L. Bullard, Norton Village, Ohio, assignor to
The Goodyear Tire & Rubber Company, Akron, Ohio
No Drawing. Filed Nov. 24, 1969, Ser. No. 879,523
Int. Cl. C08f 17/00
U.S. Cl. 260—80.7    4 Claims

ABSTRACT OF THE DISCLOSURE

A resinous material, typically essentially noncyclic, useful as a tackifier, and having a softening point in the range of from about 20° C. to about 40° C., which comprises from about 25 to 75 weight percent units derived from isobutylene, from about 5 to about 50 weight percent units derived from 1,3-butadiene, from about 5 to about 50 weight percent units derived from 2-methyl-1-butene, and up to about 10 weight percent units derived from 3-methyl-1-butene, wherein the ratio of the units derived from isobutylene to units derived from 1,3-butadiene is from about 1:1 to about 5:1.

---

This invention relates to new synthetic resins and to a method of preparing such resins. In particular, this invention relates to the preparation of resinous polymers comprising units derived from isobutylene, 1,3-butadiene, 2-methyl-1-butene and 3-methyl-1-butene.

In the presence of Friedel-Crafts type catalysts, isobutylene typically polymerizes at about 20° C. to 30° C. only very slowly to ultimately produce rubbery polymers, while 1,3-butadiene typically produces low molecular weight gummy materials with cyclization indicating crosslinking. Attempts to polymerize 2-methyl-1-butene or to polymerize 3-methyl-1-butene in the presence of a Friedel-Crafts type catalyst typically have resulted in no polymer at all, or at the most, low molecular weight oily products.

Thus, it is an object of this invention to provide new and useful polymers having tackifying properties of units primarily derived from isobutylene, 1,3-butadiene and 2-methyl - 1 - butene. It is a further object to provide a method for preparing such polymers. Other objects will become apparent as the description of the invention proceeds.

According to this invention, a resinous material, typically essentially non-cyclic and useful as a tackifier, comprises from about 25 to 75 percent units derived from isobutylene, from about 5 to about 50 percent units derived from 1,3-butadiene, from about 5 to about 50 percent units derived from 2-methyl-1-butene, and up to about 10 percent units derived from 3-methyl-1-butene, wherein the ratio of the units derived from isobutylene to units derived from 1,3-butadiene is from about 1:1 to about 5:1. Thus, a mixture of unsaturated hydrocarbon containing 4 carbon atoms which typically produce products with comparatively little commercial value are modified with at least one olefin containing 5 carbon atoms to form a resinous polymer having useful tackifying properties.

In this invention, the resinous material is prepared by polymerizing a mixture comprising from about 20 to about 75 weight percent isobutylene, from about 10 to about 50 weight percent 1,3-butadiene, from about 5 to about 50 weight percent 2-methyl-1 - butene, and up to about 15 weight percent 3-methyl-1-butene in the presence of an anhydrous catalyst selected from aluminum chloride, ethyl aluminum dichloride, stannic chloride, boron trifluoride and boron trifluoride etherate.

The resinous polymer can be modified by adding up to about 15 percent by weight units derived from other unsaturated hydrocarbons containing from 4 to 6 carbon atoms, representative of which are olefins such as 2-butene, 1-pentene, 2-methyl-1-pentene, 2-methyl - 2 - pentene, 2-methyl-2-butene and diolefins such as isoprene, piperylene and 2-methyl-1,3-pentadiene. Typically it can contain up to about 10 weight percent 2-butene. The resinous materials are modified by adding up to about 20 parts by weight of the said other unsaturated hydrocarbons to the polymerization mixture per 100 parts of the total unsaturated hydrocarbon monomer mixture. They typically contain less than 5 and preferably less than about 2 percent cyclized units.

The resinous materials prepared according to this invention have a broad softening point in the range of from about 20° C. to about 40° C. according to ASTM Method E-28-58 and thus are typically semi-liquid in this temperature range. They are typically light colored with a Gardner color of about 2 to about 5 and have a viscosity of about 10,000 cps. (centipoises) to about 12,000 cps. at 150° C. and about 400 cps. to about 800 cps. at about 250° C. They have particular utility as tackifiers in hot melt adhesives and coatings, natural and synthetic rubbers and as additives in oils, greases and asphalt blends.

In carrying out the polymerization, the mixture of monomers can be contacted with the catalyst by various means. If a gaseous catalyst is used, the catalyst is usually bubbled through a mixture of the monomers and a suitable solvent. If the catalyst is in liquid or particulate form, it is simply contacted with the monomers in solution. When a particulate catalyst is used typically it has a particle size in the range of from about 5 to about 200 mesh size, although larger or smaller particles can be used. Although the amount of catalyst is not critical, a sufficient amount of catalyst is used to cause a polymerization reaction to occur. The catalyst may be added to the monomer mixture or the monomer mixture may be added to the catalyst. If desired, the catalyst and mixture of monomers may be added simultaneously or intermittently to a reactor. The reaction can be conducted continuously or by batch process techniques generally known to those skilled in the art.

The reaction is conveniently carried out in the presence of a diluent because it is usually exothermic. However, with adequate mixing and cooling the temperature can be controlled and the reaction conducted without a diluent being present. Various diluents which are inert in that they do not enter into the polymerization reaction may be used. Representative examples of inert diluents are aliphatic hydrocarbons such as pentane, hexane and heptane, aromatic hydrocarbons such as toluene and benzene, and unreacted residual hydrocarbons from the reaction.

A wide range of temperatures can be used for the polymerization reaction. The polymerization can be carried out at temperatures in the range of from about —30° C. to about 100° C., although usually the reaction is carried out at a temperature in the range of from about —20° C. to about 50° C. The polymerization reaction pressure is not critical and may be atmospheric or above or below atmospheric pressure. Generally, a satisfactory polymerization can be conducted when the reaction is carried out at about autogenous pressure developed by the reactor under the operating conditions used. The time of the reaction is not generally critical and reaction times can vary from a few seconds to 12 hours or more.

The resinous compositions of this invention are generally soluble in aliphatic hydrocarbons such as pentane, hexane and heptane and aromatic hydrocarbons such as benzene and toluene. They are generally useful as modifiers for natural rubber and various synthetic rubbers. They are particularly useful as extenders and tackifiers in hot melts for lowering the hot melt viscosity without increasing the application temperature or diluting the melt; yet maintaining sufficient tack.

The following examples further illustrate the invention and are not intended to be limiting. In these examples, parts and percentages are by weight unless otherwise indicated.

EXAMPLE I

Into a 3-neck reactor fitted with a condenser, a Dry Ice condenser, stirrer, Dry Ice jacketed dropping funnel and a nitrogen purge system, after purging with nitrogen, was charged 100 parts of dichloro methane and 8 parts of anhydrous particulate aluminum chloride. The mixture was cooled to approximately $-12°$ C. with a Dry Ice-acetone bath. To the reactor was then slowly charged 400 parts of a hydrocarbon monomer mixture over a period of about 1½ hours while stirring. The reaction mixture was maintained at a temperature range of from about $-8°$ C. to about $-20°$ C. In about 2 hours after the exotherm subsided, the catalyst was neutralized by the addition of 20 cubic centimeters of isopropyl alcohol followed by 10 cubic centimeters of water. The mixture was filtered and the filtrate distilled to a pot temperature of about 250° C. at a reduced pressure of about 10 millimeters of mercury. A yield of resinous material was obtained of about 225 parts or a 56% yield. The resin was a viscous semi-liquid, tacky and very light in color, having a Gardner color of about 2.

The liquid hydrocarbon monomer mixture comprised the following:

| Compound: | Percent |
|---|---|
| Unsaturated hydrocarbons— | |
| Isobutylene | 45 |
| 1,3-butadiene | 12.7 |
| 2-methyl-1-butene | 22.5 |
| Other unsaturated hydrocarbons having from 4 to 6 carbon atoms | 17.5 |
| Saturated hydrocarbons | 2.3 |

A material balance around the reaction system indicated the liquid resin to have the following composition:

| Compound: | Parts |
|---|---|
| Isobutylene | 157.4 |
| Trans-2-butene | 4.3 |
| Cis-2-butene | 2.1 |
| 1,3-butadiene | 41.2 |
| 3-methyl-1-butene | 3.1 |
| 1-pentene | 1.5 |
| 2-methyl-1-butene | 90.4 |
| Other | 1.9 |

EXAMPLE II

A reactor was fitted with a Dry Ice-cold finger, thermometer, Dry Ice jacketed additional funnel and a stirrer. The reactor was charged with 44 parts of anhydrous AlCl$_3$ and 575 parts of dichloromethane. To the reactor was then slowly charged 2200 parts of a hydrocarbon mixture over a period of 2½ hours while stirring. The reaction mixture was maintained at a temperature range of from about $-15°$ C. to about $-5°$ C. In about 3 hours the exotherm subsided. The mixture was allowed to stir for 2 hours after addition was finished. The catalyst was then neutralized with 100 parts ml. of methanol. About 1400 parts of heptane was added to help in the filtration. The mixture was filtered and distilled to a pot temperature of 200° C. under nitrogen. Steam at 250° C. was added and the pot temperature allowed to go to 235° C. The temperature was held here until the water to oil ratio in the distillate was 20/1. The yield was 1707 parts of a semiliquid resin with a softening point of 28° C. according to ASTM Method E 28-58T and had a Gardner color of 2. The material had a viscosity of 560 cps. (centipoises) at 121° C., 3060 cps. at 198° C., and 14,700 cps. at 150° C., as determined by a Brookfield viscometer Model HBT. The hydrocarbon monomer mixture and resulting resin compositions were similar to those of Example I.

EXAMPLE III

To a suitable heat jacketed container is charged 40 parts of a synthetic hydrocarbon resin prepared according to the method of Example II and 60 parts of a particulate polyethylene. The polyethylene has a molecular weight of about 1500 of the type obtainable as polyethylene 617A from the Allied Chemical Company. The mixture is blended in its molten state by heating the jacket of the container to about 177° C.

The mixture, or hot melt, is coated in its tacky molten state at about 110° C. with a No. 2 Mayer wood rod both onto the surface of a paperboard substrate and onto the surface of an aluminum foil. The paperboard has a thickness of about 15 mils of the type obtainable as Marathon 15 point paperboard Spec. No. 1296. While the hot melt adhesive coatings are still in their molten state, a second paperboard is adhered to the coated paperboard surface and a second strip of aluminum foil is adhered to the coated aluminum foil surface to form two separate laminates. The laminates are cooled to about 25° C. with the hot melt adhesive showing good adhesion to the paperboard and to the aluminum foil.

If desired, a small amount of extenders, plasticizers, waxes and various oils, preferably heat stable oils such as mineral oil or safflower oil, can be mixed with the hot melt in its molten state to increase its flexibility including low molecular weight polystyrene, chlorinated paraffins and chlorinated polyphenyls.

Thus, in accordance with this invention, a hot melt adhesive composition comprises an admixture of the essentially non-cyclic typically semi-liquid resinous material and at least one thermoplastic polymer where the said resinous material is preferably present in an amount of from about 10 to about 70 weight percent of the hot melt composition.

In the practice of this invention, various thermoplastic base polymers can be used in the hot melt. Preferably they are characterized by having melt flow (ASTM Method D-1238-57T) of from about 5 to about 5000 and a viscosity of from about 100 cps. (centipoises), to about 5000 cps. at about 350° F. Representative examples of the various thermoplastic polymers are polyethylene having a molecular weight of from about 1200 to about 21,000, isotactic and atactic polypropylene, polybutene, ethylene-propylene copolymers having a propylene content of from about 25 to about 75 mole percent, ethylene-vinyl acetate copolymers and ethylene-ethylacrylate copolymers.

The hot melt adhesives can be prepared by blending the resinous material with the thermoplastic polymers to achieve a substantially homogeneous mixture. For example, they can be blended to form a molten mixture at temperatures of from about 240° F. to about 400° F. depending somewhat upon the melting point of the thermoplastic polymer. If desired, the thermoplastic polymer and/or resinous material can be preheated to their molten state before blending. Other mixing methods normally used for blending such materials can be used if desired. The prepared composition can then be used directly or it can be extracted in various forms for use in appropriate hot melt adhesive applicators.

While certain representative embodiments and details have been shown for the purpose of illustrating the invention, it will be apparent to those skilled in the art that various changes and modifications may be made therein without departing from the spirit or scope of the invention.

What is claimed is:

1. A resinous material having a softening point in the range of about 20° C. to about 40° C. which comprises from about 25 to about 75 weight percent units derived from isobutylene, from about 5 to about 50 weight percent units derived from 1,3-butadiene, from about 5 to about 50 weight percent units derived from 2-methyl-1-butene, and up to about 10 weight percent units derived from 3-methyl-1-butene where the ratio of units derived from isobutylene to units derived from 1,3-butadiene is from about 1:1 to about 5:1 prepared by the method which comprises polymerizing a mixture comprising from about 20 to about 75 weight percent isobutylene, from about 10 to about 50 weight percent 1,3-butadiene, from about 5 to about 50 weight percent of 2-methyl-1-butene and up to about 15 weight percent of 3-methyl-1-butene, at a temperature in the range of about −20° C. to about 50° C., in the presence of an anhydrous catalyst selected from aluminum chloride and ethylaluminum dichloride.

2. The resinous material of claim 1 essentially non-cyclic and having a viscosity of from about 10,000 centipoises to about 12,000 centipoises at 150° C.

3. The resinous material of claim 1 modified by containing up to about 15 weight percent units derived from other unsaturated hydrocarbons containing 4 to 6 carbon atoms and having a softening point in the range of about 20° C. to about 40° C.

4. The resinous material of claim 3 where the other unsaturated hydrocarbons are selected from 2-butene, 1-pentene, 2-methyl-1-pentene, 2-methyl-2-pentene, isoprene, piperylene, and 2-methyl-1,3-pentadiene.

References Cited
UNITED STATES PATENTS

| | | | |
|---|---|---|---|
| 2,523,150 | 9/1950 | Schneider et al. | 260—82 |
| 2,581,154 | 1/1952 | Walsh et al. | 260—85.3 |
| 3,014,012 | 12/1961 | Riley et al. | 260—82 |

JOSEPH L. SCHOFER, Primary Examiner

S. M. LEVIN, Assistant Examiner

U.S. Cl. X.R.

117—132 CB, 155 UA; 161—217, 270; 260—23.7 R, 82, 86.7, 87.3, 88.2 R, 93.7, 94.2, 889